United States Patent [19]
Davis

[11] 3,709,521
[45] Jan. 9, 1973

[54] TUG VEHICLE WITH REAR CORNER WINDOW

[75] Inventor: Walter L. Davis, Sandy, Utah

[73] Assignee: Ibex, a Division of Jelco, Salt Lake City, Utah

[22] Filed: Aug. 9, 1971

[21] Appl. No.: 170,201

[52] U.S. Cl. ................... 280/421, 296/28 C, 180/89
[51] Int. Cl. ......................... B62d 53/00, B63d 27/00
[58] Field of Search .............. 296/28 C; 280/421, 422

[56] References Cited

UNITED STATES PATENTS

| | | | |
|---|---|---|---|
| 2,626,552 | 1/1953 | Oehler et al. | 280/421 |
| 2,733,033 | 1/1956 | Gunderson | 248/51 |
| 3,279,823 | 10/1966 | Thouvenelle et al. | 280/421 |
| 3,341,247 | 9/1967 | Martinmaas | 296/28 C |
| 3,426,273 | 12/1969 | Williams et al. | 296/28 C X |

*Primary Examiner*—Leo Friaglia
*Attorney*—B. Deon Criddle

[57] ABSTRACT

A corner window for use in tug type truck vehicles through which a driver can engage and disengage air lines and electrical hookups to a truck trailer. A number of individual window panes are hinged together, and rollers at the tops and bottoms of the couplings travel within tracks forming the bottom and top window casings. At least one sheet of flexible insulation material is arranged adjacent to the exterior of each window at the upper and lower tracks. The insulation material deforms to remain in continuous sealing contact with the window as the panes project beyond the tracks as the window negotiates the curves in the tracks.

5 Claims, 7 Drawing Figures

PATENTED JAN 9 1973

INVENTOR:
WALTER L. DAVIS.
BY: *B. Dean Riddle*
ATTORNEY.

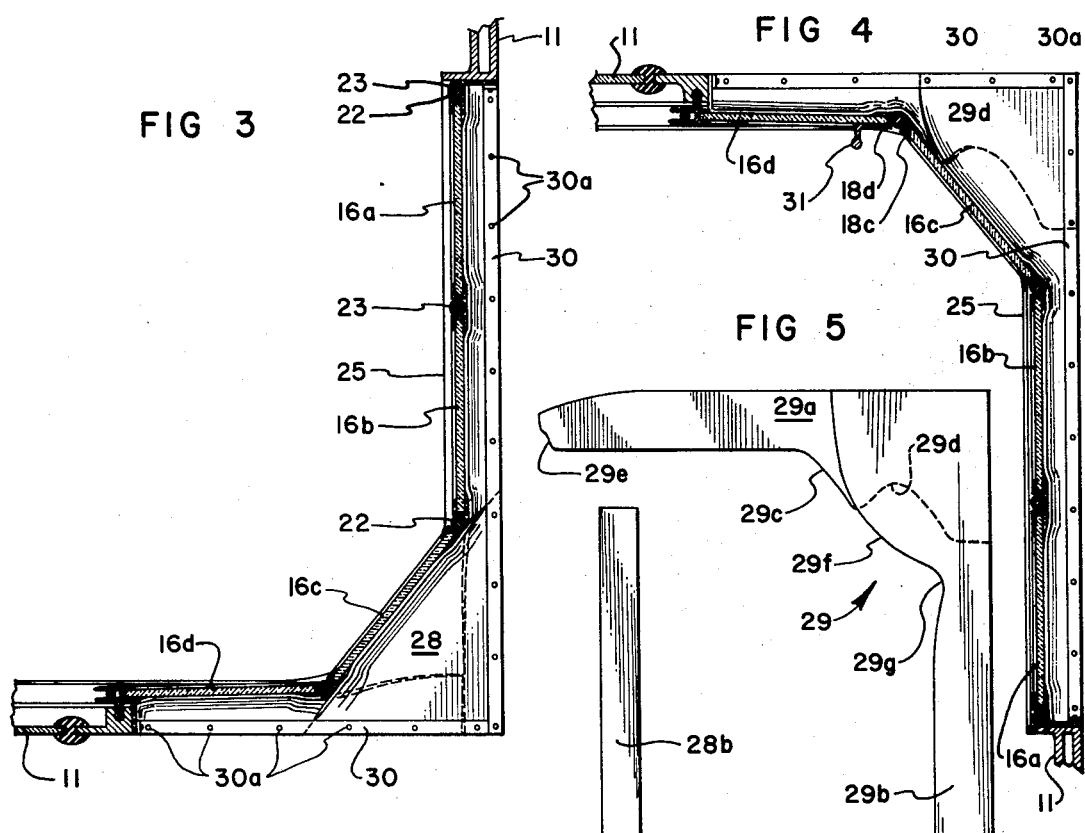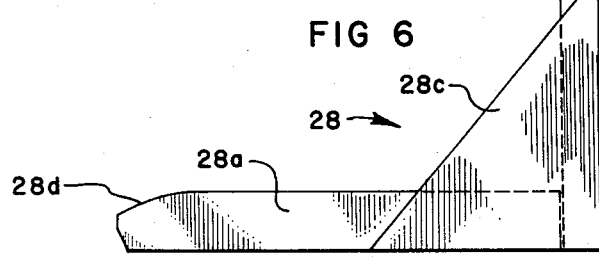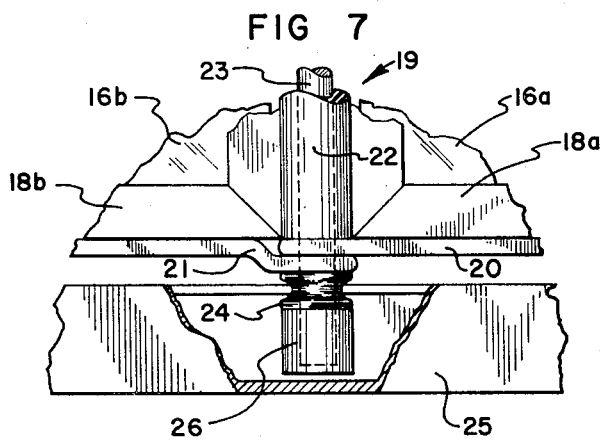

TUG VEHICLE WITH REAR CORNER WINDOW

BRIEF DESCRIPTION OF THE INVENTION

1. Field of the Invention

This invention relates to a window assembly which is easily opened and closed over a corner window in the rear of a vehicle cab.

2. Prior Art

Small cabbed vehicles known as "tugs" are frequently used in the yards of trucking companies to move and park large truck cargo trailers. The tugs must be frequently connected to and disconnected from the trailers and it is very time consuming for an operator to have to climb out of a tug cab each time it is necessary to hook up the air and electrical systems of the tug to the corresponding systems of a trailer, or to disconnect them.

In the past, tugs have been provided with an open cab, from which hookups can be made, or with a closed cab having the usual vehicle fixed rear window. On occasion a flexible closure of plastic or other suitable flexible material is arranged to close a cab opening such that an operator can lift the closure out of the way when it is necessary for him to reach through the opening to make a hookup. All such prior arrangements have proven at least somewhat unsatisfactory as the driver is forced to climb in and out of the tug, or is exposed to the open air during all use of the tug, or he is forced to roll up a covering of plastic or like material every time access is necessary to reach through the rear of the vehicle cab to make a hookup. The present invention provides a rear corner vehicle window which can be left open when the weather permits or that can be easily and rapidly opened and closed during adverse weather.

SUMMARY OF THE INVENTION

It is a principal object of the present invention to provide a tug having a rear corner window through which an operator can easily reach to make hookups of air, electrical and hydraulic systems between the tug and cargo trailers.

Other objects of the present invention are to provide a window for a rear corner of a vehicle cab that can be easily moved between a fully opened and a closed position and that will form parts of the cab wall at the corner.

Other objects are to provide a window which is capable of being rapidly and easily opened and closed by an operator sitting within the vehicle cab.

Principal features of the present invention include a tug having a composite corner window comprising a number of individual window panes, each of which is individually framed, and hinge means interconnecting the panes. Rollers are provided at the top and bottom of each hinge means and the rollers travel freely within closed tracks positioned within the interior of the cab of the tug. The composite window and upper and lower tracks are arranged such that an operator can lean through the rear corner of the tug cab and can, therefore, reach a maximum distance towards the rear of the tug during hookups.

Other features include the placement of one or more layers of flexible sheet material proximate to the exterior of the window, on line with each window track. An edge of each sheet or panel rests against the outside of the window to provide a weather seal therebetween in at least some positions of the window. The sheets deform to adjust to lateral movement within and movement outward from the track, of the individual window panes as they negotiate the bends in the tracks.

Additional objects and features of the invention will become apparent from the following detailed description and drawings, disclosing what is presently contemplated as being the best modes of the invention.

THE DRAWINGS

FIG. 1 is a perspective view of a tug type vehicle of the invention with an operator in the cab thereof reaching through the corner window to manipulate an air coupling;

FIG. 2, a perspective view of the interior of the tug cab of FIG. 1, showing the tracks within which the window travels and with the corner window in position closing the corner opening;

FIG. 3, a horizontal section taken on the line 3—3 of FIG. 2;

FIG. 4, a horizontal section view taken on the line 4—4 of FIG. 2;

FIG. 5, a top plan view of the sheet seal shown in FIG. 4;

FIG. 6, a similar view of the sheet seals shown in FIG. 3; and

FIG. 7, an enlarged, partially broken away view taken within line 7—7 of FIG. 2, showing the window sections hinged together and with typical roller structure on an end of the hinge and within a typical window track.

DETAILED DESCRIPTION

Figure 1:
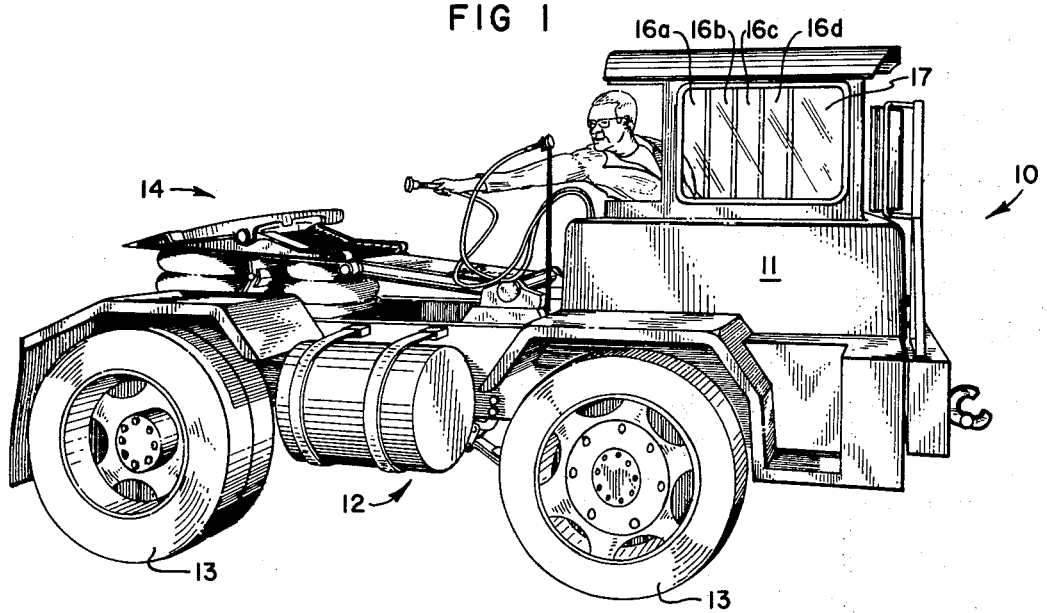

Referring now to the drawings:

In the illustrated preferred embodiment, the tug vehicle of the invention, shown generally at 10 includes a cab 11, frame 12 and wheels 13. Conventional vehicle power, steering and braking systems not shown, are provided and a conventional automatic trailer coupling unit 14 is provided on the frame of the truck, behind the cab. A composite corner window, shown generally at 15, includes a series of window panes 16a, 16b, 16c and 16d, and the usual vehicle side window is shown at 17. The panes 16a–16d are respectively enclosed within frames 18a, 18b, 18c and 18d and the frames of adjacent window panes are articulatively connected by hinges 19, shown best in FIG. 7. Overlapping brackets 20 and 21, shown typically in FIG. 7, are respectively secured to the top and bottom edges of adjacent frames 18a–18.

The hinges 19 comprise tubular spacers 22 extending between the upper and lower overlapping brackets and shafts 23 extending through the spacers and through the overlapping brackets. Each shaft 23 have grooved rollers 24 journalled thereon and the rollers are arranged to travel within inturned flanges 25a and 25b of guide channels 25 that are arranged above and below the frames 18a–18d. End caps 26 on the ends of the shafts 23 hold the rollers in place.

Guide channels 25 are closed at their ends to hold the rollers 24 therein and each extend along a portion of the back wall of the cab 11, diagonally between the rear and side walls and on the side wall and along the window 17. The diagonal distance between the respective legs on the side and rear walls is essentially the same as the width of one window pane and its associated frame.

Figure 2:
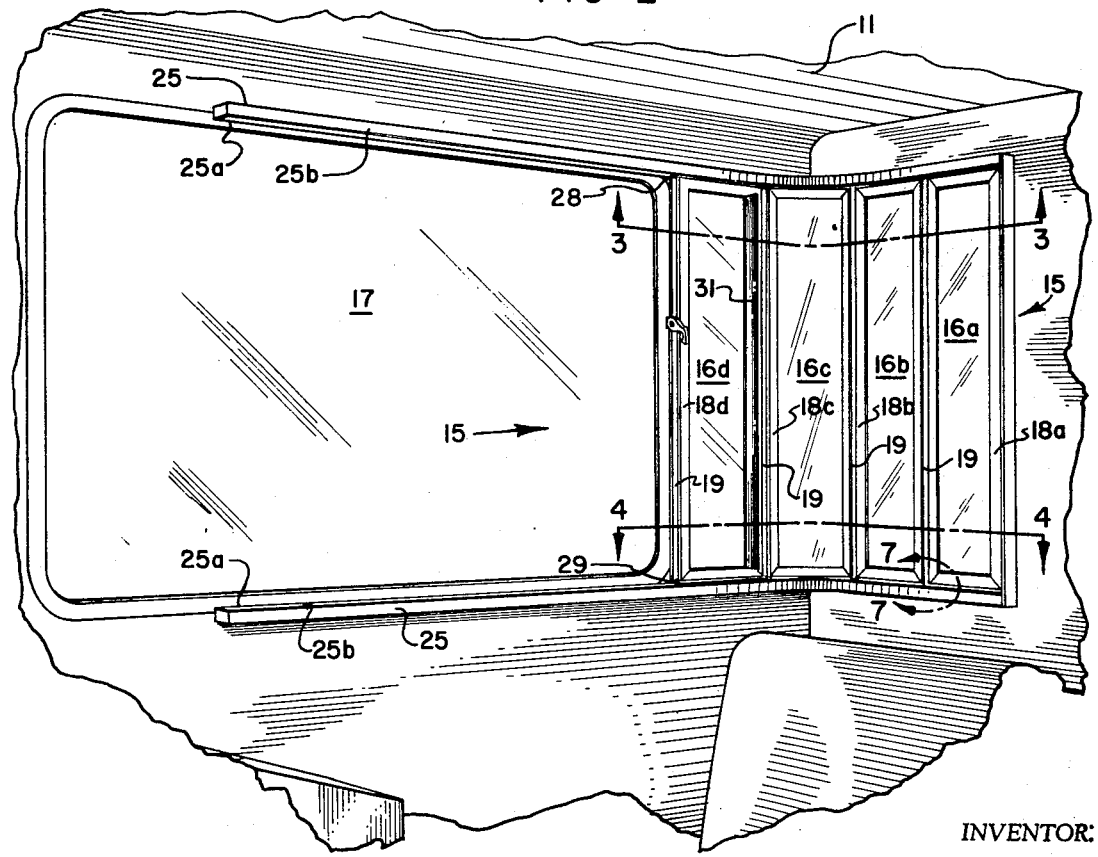

The composite window 15 is shown in FIG. 2, positioned to close the corner window opening of cab 11. As best seen in FIGS. 3 and 4, thin flexible upper and lower seals 28 and 29, respectively, of rubber or other suitable material are arranged to have portions thereof resting on the window 15. The seals 28 and 29 are attached by rigid anchoring strips 30 and rivets 30a to the vehicle cab.

Upper seal 28 is made up of three pieces 28a, 28b and 28c arranged such that the essentially rectangular piece 28a is on the edge of the window opening formed in the rear of cab 11 and abuts the rectangular piece 28b, which is on the edge of the window opening at the side of the cab. The piece 28c is triangular and is placed in the corner formed by pieces 28a and 28b and overlies them. The anchoring strips 30 clamp the outermost edges of the seal 28 to the cab housing and the innermost edges engage the panes 16a–16d of the window when the panes are within the window opening and turn downwardly. The end of piece 28a remote from piece 28b is diagonally cut, at angled edge 28d, so that as the composite window is moved in the upper guide channel 25 in and out of contact with seal 28, the seal will be guided onto the side of the window and will not prevent travel of the window into and out of the window opening.

Upper seal 28 remains in continuous contact with the panes of the window, except that contact may be lost with a pane as it moves from one straight portion of track to another. The cab overhang prevents moisture entering the cab any openings that may develop between the seal 28 and the window.

Lower seal 29 is made up of two pieces 29a and 29b, each of which has a long extension and an enlarged somewhat triangular corner portion. Piece 29a extends along the window opening at the rear of the cab housing and the corner portion thereof is angled at 29c to correspond to the channel 25, and has a curved notch 29d therein to insure pickup of the piece 29 by a returning window pane. A diagonal or angled edge 29e at the end of piece 29a insures pickup of the piece as the window panes are moved into the window opening.

The enlarged portion of piece 29b overlies and forms a continuation of the angled portion 29c of piece 29a at 29f, and a recessed curved notch 29g that insures pickup of the extended portion of piece 29b in one direction of travel of the window panes and pickup of the enlarged portion in the other direction of travel.

In operation, the window 15 is moved in channel 25 between a fully opened position on the side wall of cab housing 11 and a fully closed position extending along the side and rear walls and closing the opening formed at the corner intersection of the side and rear walls of the cab.

In operation, an operator will position the tug such that it can be coupled to a trailer. Then he will grasp the handle 31 (FIG. 4) projecting from a frame, here shown as frame 18d, to slide the window panes in channels 25 to the side wall of the cab and completely out of the corner window opening. The operator can then reach fully through the window opening to make the hookup of air and electrical systems between tug and trailer. Thereafter the window can again be rolled to its closed position wherein the leading edge of frame 18a abuts cab housing 11 at the rear of the cab.

Each window pane is dimensioned to have the same top and bottom dimensions as the upper and lower track section which extends at 45° with respect to those straight sections which are normal to one another. Thus, the pivot connections between panes allow them to be travelled around the tracks.

As the composite window moves from its open position to its closed position the leading edges of the window frames contact the angled edges 28d and 29e of the upper and lower seals 28 and 29, respectively, and folds the seals back so that the seals thereafter remain in constant contact with the sides of the window panes.

Although a preferred form of my invention has been herein disclosed, it is to be understood that the present disclosure is by way of example and that variations are possible without departing from the subject matter coming within the scope of the following claims, which subject matter I regard as my invention.

I claim:

1. In combination
   a tug type truck having a cab extending from one side to the middle thereof at the front of the truck frame;
   a corner window opening in the rear of the truck cab at the corner in the middle of the truck frame;
   air and electrical hookup lines at the center of the truck frame adjacent to the rear of the truck cab and accessible to an operator sitting within the cab and reaching through the said window opening, whereby said hookup lines can be connected to a trailer coupled to said truck;
   a window; and
   means mounting said window whereby said window is movable to a position closing the corner window opening and a position completely out of the way of said opening.

2. The combination of claim 1, wherein the window comprises
   a plurality of individually framed window panes, said frames all being of the same size;
   hinge means interconnecting the frames of adjacent panes; and wherein the means mounting the window includes
      upper and lower tracks each having straight sections on the side of the cab and on the rear of the cab and with said straight sections extending normal to one another and connected by a diagonal straight section, said diagonal straight section having the same length as a window pane and frame thereon and extending at a forty-five degree angle with respect to said straight sections.

3. The combination of claim 2, wherein the means mounting said window further includes
   a shaft extending through each hinge means;
   rollers journaled onto the opposite ends of said shafts, and travelling within said guide tracks.

4. The combination of claim 3, further including
   upper and lower seal means fixed to the cab and positioned at the top and bottom of the window opening and adjacent to and butting against the outside of the corner window when the said window is in place over the window opening.

5. The combination of claim 4, wherein the sealing means each includes a plurality of overlapping flexible panels at the top and bottom of the window opening which panels overlap each other at the corner of the vehicle cab, each of said panels being formed to be deflected by the window panes of the window whereby portions of the panels rest against the panes during travel of the window.

* * * * *